Nov. 20, 1928.
L. E. SEDERBERG
1,692,470
CATTLE STALL BAR
Filed Aug. 19, 1926
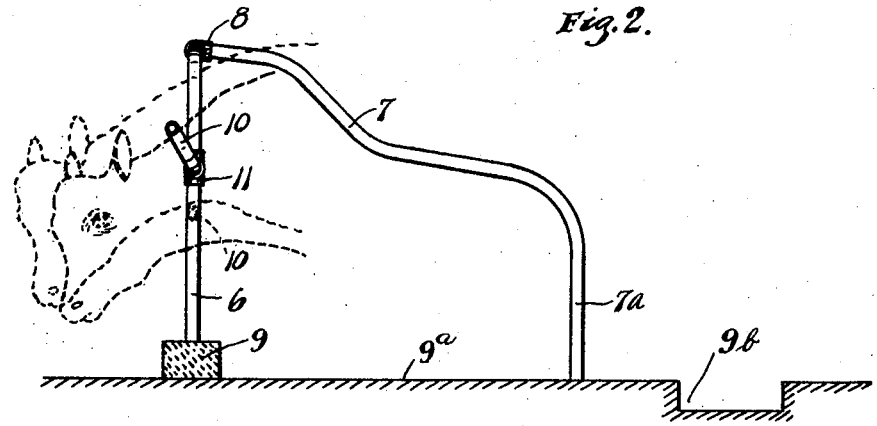
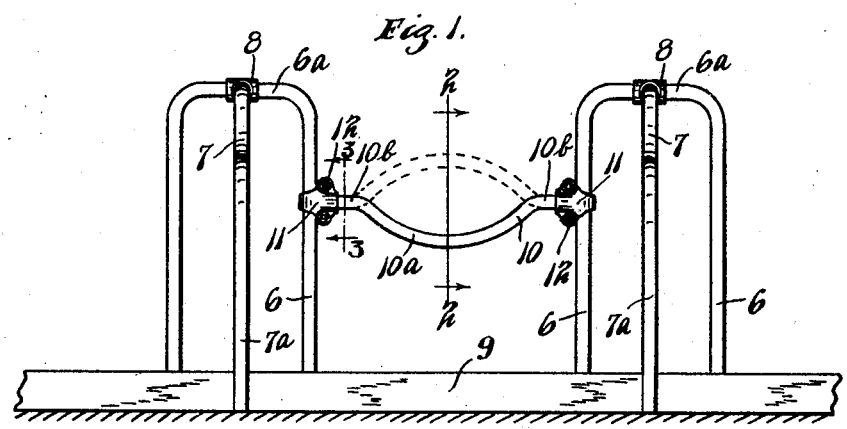
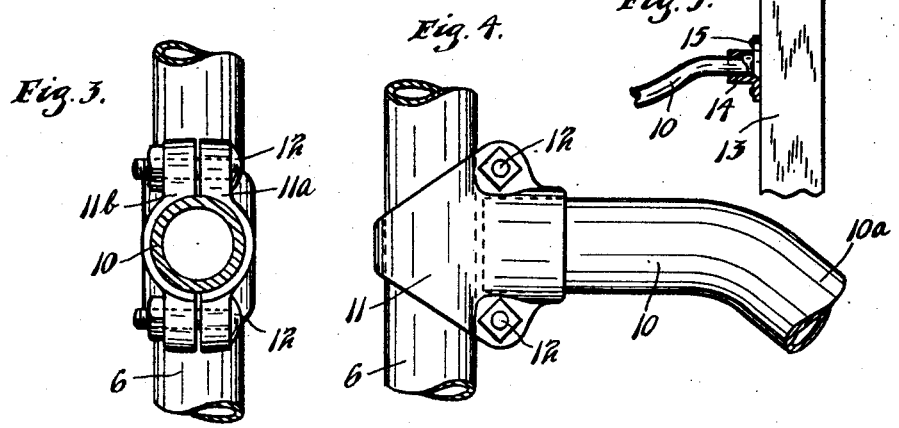
INVENTOR.
LUDWIG E. SEDERBERG.
BY HIS ATTORNEYS.

Patented Nov. 20, 1928.

1,692,470

UNITED STATES PATENT OFFICE.

LUDWIG E. SEDERBERG, OF ST. PAUL, MINNESOTA.

CATTLE-STALL BAR.

Application filed August 19, 1926. Serial No. 130,224.

This invention relates to a cattle stanchion and particularly to that type of cattle stanchion having spaced posts at the front of the stalls between which a floating bar extends which forms the front portion or barrier of the stall. With this type of stall the animals are usually tethered by chains or ropes connected to neck or head halters on the animals.

In the use of this type of stall having the floating bar, it has been found that even though the bar is mounted for vertical sliding movement on the posts, the same has an objectionable action on the animal, often rubbing sores on the neck thereof.

It is an object of this invention to provide such a stanchion having a member extending between the posts which is swingable or rotatable and which will adjust itself to the position of the animal without any injury or discomfort to the animal.

It is a further object of the invention to provide a stanchion having a member extending between the front posts thereof which member has a bowed or curved portion adjacent the center thereof, said member being revoluble whereby the central portion thereof is disposed in various vertical positions.

It is more specifically an object of this invention to provide a stanchion having a bar extending between the front posts thereof having a bowed central portion with alined straight end portions revolubly mounted in members secured or clamped to said posts and vertically adjustable thereon.

These and other objects and advantages of the invention will be fully set forth in the following description made in connection with the accompanying drawings, in which like reference characters refer to similar parts throughout the several views and in which:—

Fig. 1 is a view in rear elevation of a stanchion, showing another position of the floating bar in dotted lines;

Fig. 2 is a vertical section taken on line 2—2 of Fig. 1 as indicated by the arrows;

Fig. 3 is a vertical section taken on line 3—3 of Fig. 1;

Fig. 4 is a view in rear elevation of a portion of the stanchion, Figs. 3 and 4 being shown on an enlarged scale; and Fig. 5 is a view partly in rear elevation and partly in vertical section showing the construction at an end post.

Referring to the drawing, a stanchion is shown having a front portion comprising the spaced vertical posts 6 connected at their upper ends by the portions 6ª. The partition members 7 for the stalls are secured by a coupling 8 of the usual type to the central part of the portion 6ª and extend rearwardly and downwardly to the rear of the stall where they have the vertical portions 7ª secured in the floor 9ª. The posts 6 are shown as secured in the usual cement or concrete curb 9 commonly used at the front of the stalls and a trough 9ᵇ is shown in the floor such as is commonly provided to carry away the refuse.

In accordance with the present invention a transverse member 10 is provided forming the front member or barrier of the stall. While this member 10 may be variously formed, in the embodiment of the invention illustrated it is shown as a round bar or pipe and the same has a curved or bowed central portion 10ª at the ends of which are alined straight end portions 10ᵇ. The portions 10ᵇ are rather loosely and revolubly mounted in the members 11 embracing and clamped to the posts 6. The members 11 comprise sleeve portions 11ª extending partially around the posts 6 and the clamping caps 11ᵇ secured to the portions 11ª by the headed and nutted bolts 12. It will be seen that the members 11 can thus be adjusted vertically on the posts 6.

In the type of stanchion described, the animals are tethered by neck or head halters connected to chains or ropes which are attached in any suitable manner to the posts 6, said tethering means not being shown.

In operation the member 10 will be adjusted to the desired height for the animals. The feed for the animals is usually placed in front of the member 9 and when the animals are eating, they usually have their heads in comparatively low position as seen in the lower position in dotted lines in Fig. 2. At such times the animal's neck will be disposed beneath the member 10 and as the animal raises its head slightly after getting a mouthful of feed, the member 10 will loosely and easily swing on the neck of the animal. This swinging motion will, as shown in Figs. 1 and 2, raise the central or yoke portion 10ª of the member 10 so that the member 10 thus adjusts itself to the height of the animal's neck. The animal can also move forwardly in the stall and the member 10 will be raised to accommodate this movement. It will be seen that the entire weight of the member 10 is thus not on the animal's neck. The member also will engage different portions of the neck so that there is no danger of excessive rubbing on the animal's neck. At the same time the member 10 swings freely and gives great freedom of movement. After the animal has finished eating, it usually chews its cud and at this time the animal has its head and neck in a higher position. At such times the animal can readily place its head over the central portion 10ª of the member 10 which will hang in its lowest position, as shown in Fig. 1, the animal's head being disposed as shown in the upper position in dotted lines in Fig. 2 or in a higher position. At such time the member 10 will thus not be resting on the animal's neck and the animal will be in free and comfortable position.

If an end post is used in the stable or barn, such as the square post 13 shown in Fig. 5, the member 10 may be journaled in a flanged sleeve 14 which may conveniently be attached to the post 13 by the screws 15.

From the above description it is seen that applicant has provided a very simple and efficient construction of stanchion and one having a front barrier by means of which the animal may at all times be in comfortable position and yet can make all the necessary movements. Chafing of the animal's neck or the rubbing of sores thereon is thus avoided. The device is very simple and can be installed at no more expense than the previously used objectionable devices. The stanchion has been amply demonstrated in actual practice and found to be very successful and efficient.

It will, of course, be understood that various changes may be made in the form, details, arrangement and proportions of the parts, without departing from the scope of applicant's invention, which, generally stated, consists in a device capable of carrying out the objects above set forth, in the novel parts and combinations of parts disclosed and defined in the appended claims.

What is claimed is:—

1. A stanchion having in combination, spaced front posts, a member extending therebetween and having a yoke-like portion between its ends, said member being revolubly mounted whereby said yoke-like portion may be disposed in various vertical positions.

2. A stanchion having in combination, spaced posts, and a curved member extending between said posts revolubly mounted about an axis extending substantially at right angles to said posts, said curved member being disposed so that the animal's head is thereunder, when the animal is feeding, but the animal's head may be disposed above said member when not feeding.

3. A stanchion having in combination, spaced front posts and a member extending therebetween having a bowed portion adjacent its center and being revolubly mounted at its ends, said member being disposed so that the animal's head and neck will be under said bowed portion when feeding and said bowed portion can be swung about the ends of said member by the animal's neck, but the animal can have its head disposed above said bowed portion when not feeding.

4. A stanchion having in combination, spaced front posts, a bar extending between said posts having a bowed central portion and means secured to said posts in which the ends of said bar are revolubly supported, said bar being disposed at a height so that a cow can place its head under the same and readily lift said bowed central portion by rotation of a bar about its ends, or the cow can place its head above the bowed central portion, said bowed central portion swinging by gravity to position with its concave side disposed upwardly.

5. A stanchion having in combination, spaced front posts, a bar extending between said posts having a bowed central portion, and having straight alined ends, supporting means clamped to said posts and adjustable thereon in which said end portions of said bar are revolubly mounted.

6. A stanchion having in combination, spaced vertical front posts, a bar extending between said posts having substantially horizontal end portions, members clamped to said posts and vertically adjustable thereon, adapted to receive the ends of said end portions, said end portions being revoluble in said members and said bar having an arcuate portion between said end portions and symmetrically disposed in relation to said end portions.

In testimony whereof I affix my signature.

LUDWIG E. SEDERBERG.